United States Patent
Nishikido et al.

(10) Patent No.: US 9,154,391 B2
(45) Date of Patent: Oct. 6, 2015

(54) TRANSMISSION LINE DISCONNECTION DETECTION METHOD AND SLAVE STATION USED FOR THE METHOD

(75) Inventors: Kenji Nishikido, Osaka (JP); Youichi Hoshi, Kyoto (JP); Kazuo Itani, Osaka (JP)

(73) Assignee: ANYWIRE CORPORATION, Kyoto (JP)

( * ) Notice: Subject to any disclaimer, the term of this patent is extended or adjusted under 35 U.S.C. 154(b) by 0 days.

(21) Appl. No.: 14/346,861

(22) PCT Filed: Sep. 26, 2011

(86) PCT No.: PCT/JP2011/071885
§ 371 (c)(1),
(2), (4) Date: Jun. 12, 2014

(87) PCT Pub. No.: WO2013/046296
PCT Pub. Date: Apr. 4, 2013

(65) Prior Publication Data
US 2014/0321520 A1 Oct. 30, 2014

(51) Int. Cl.
*H04L 12/26* (2006.01)
*H04B 3/46* (2015.01)

(52) U.S. Cl.
CPC .............. *H04L 43/0811* (2013.01); *H04B 3/46* (2013.01)

(58) Field of Classification Search
CPC ... H04L 43/08; H04L 43/0811; H04L 7/0008; H04B 3/46; H04B 17/21; H04B 3/50; H04J 3/24
See application file for complete search history.

(56) References Cited

U.S. PATENT DOCUMENTS

| | | | |
|---|---|---|---|
| 5,509,029 A | 4/1996 | Furuta | |
| 5,838,249 A | 11/1998 | Saito et al. | |
| 2003/0123590 A1* | 7/2003 | Saitou et al. | 375/354 |
| 2008/0046603 A1* | 2/2008 | Kobayashi et al. | 710/17 |
| 2009/0304382 A1* | 12/2009 | Saitou et al. | 398/43 |
| 2011/0302344 A1* | 12/2011 | Bell et al. | 710/110 |
| 2012/0030388 A1* | 2/2012 | Bas et al. | 710/106 |
| 2014/0219383 A1* | 8/2014 | Hiroi et al. | 375/295 |

FOREIGN PATENT DOCUMENTS

| | | |
|---|---|---|
| JP | 62-173830 | 7/1987 |
| JP | 7-99503 | 4/1995 |
| JP | 9-84155 | 3/1997 |

* cited by examiner

*Primary Examiner* — Aristocratis Fotakis
(74) *Attorney, Agent, or Firm* — Greenblum & Bernstein, P.L.C.

(57) ABSTRACT

A control/monitor signal transmission system that employs a transmission synchronization scheme in which a master station connected to a single control unit and a plurality of slave stations corresponding to a plurality of controlled apparatuses synchronize with each other through a transmission clock and data is transmitted therebetween over a common data signal line, a transmission line disconnection detection method that enables a disconnection of a transmission line to be detected precisely; and a slave station that is used for this method. A continuous pulse signal that the master station outputs to the common data signal line is provided with a management data region that includes a plurality of pulse signals and that differs from a control/monitor data region including data of a control data signal and data of a monitor data signal.

8 Claims, 7 Drawing Sheets

| table number | 0 | 1 | 2 | | n |
|---|---|---|---|---|---|
| IDX address data | #ad0 | #ad1 | #ad3 | | #adm |

Fig. 7

TRANSMISSION LINE DISCONNECTION DETECTION METHOD AND SLAVE STATION USED FOR THE METHOD

TECHNICAL FIELD

The present invention relates to a transmission line disconnection detection method for detecting a disconnection of a transmission line in a control/monitor signal transmission system, and a slave station used for the method, wherein the control/monitor signal transmission system decreases the number of signal lines between a master station connected to a single control unit and a plurality of slave stations corresponding to a plurality of controlled apparatuses, thereby connecting them with a common data signal line; and employs a transmission synchronization scheme in which the master station and the slave stations synchronize with each other through a transmission clock and data is transmitted therebetween over the common data signal line.

BACKGROUND ART

In a control system comprising a single control unit and a plurality of controlled apparatuses (including: a controlled part for operating in accordance with an instruction from the control unit; and a sensor part for sending information to the control unit), a technique for decreasing the number of wires, or so-called simplification, has been widely performed. As a typical technique for the simplification, a method has been widely employed, in which a master station and a plurality of slave stations that have a conversion function of parallel and serial signals are connected to a control unit and a plurality of controlled apparatuses, respectively, whereby data is sent and received between the master station and the slave stations through a serial signal, instead of parallel connection by which individual signal lines extending from the controlled apparatuses are directly connected to the control unit.

In realizing the simplification with many slave stations connected, if a location of a disconnection cannot be identified from the side of a control unit, it is necessary to check the wiring of each slave station positioned far away from the control unit. In this case, there needs to be a lot of steps to identify a location of a disconnection.

Accordingly, there is proposed a method of confirming a disconnection on the side of slave stations from the side of a control unit. For example, Japanese Unexamined Patent Application Publication No. S62-173830 discloses a disconnection detection method for a time-division multiplex transmission system, in which: a plurality of terminal parts with a preset address are connected to a single master part via a common signal line; and the master part sequentially transmits transmission signals while cyclically changing the designated addresses and receives return signals from the designated terminal parts. In this disconnection detection method, when the master part detects that a state of being unable to receive the return signal from any terminal part is continuously generated over a predetermined number of transmission cycles, the occurrence of a disconnection of single line is judged.

This disconnection detection method employs, as a scheme for transmitting or receiving data between a plurality of apparatuses, a command scheme in which a partner for sending or receiving data (slave station) is designated by data for identifying the partner (address data). This command scheme can be employed even in a simplification system in which data is sent and received through a serial signal. However, the command scheme has a problem that the transmission efficiency is reduced when the amount of command data (address data) exceeds that of data for a transmission purpose. In order to increase the transmission efficiency of a serial signal, a transmission synchronization scheme may be preferred in which data is sent and received through a monitor signal and a control signal sequentially sent in a pulse cycle that does not contain address data. In the simplification techniques, the command scheme and the transmission synchronization scheme are selectively used depending on an application. Even for systems employing the transmission synchronization scheme, there is proposed a method of confirming a disconnection on the side of slave stations, from the side of a control unit.

For example, Japanese Unexamined Patent Application Publication No. H07-099503 discloses a data transmission apparatus that can easily identify a location of an abnormality in a transmission path. In this data transmission apparatus, each terminal part is provided with answer means. This answer means outputs a confirmation signal to an end region of pulse signals in one cycle to be transmitted to a single line when a count value in a cycle counter for the slave station becomes a preset value assigned thereto. Then, abnormality detection means connected to the signal line determines the presence or absence of the confirmation signal that corresponds to the count value in the cycle counter thereof and that is transmitted from the answer means of any terminal part. If the confirmation signal is present, the abnormality detection means determines that there is no connection abnormality in the terminal part corresponding to the counter value, and outputs a check signal to the end region of the pulse signals in one cycle to be transmitted to the signal line. If the confirmation signal is absent, the abnormality detection means determines that there is a connection abnormality in the terminal part corresponding to the counter value, and does not output the check signal. This enables a master part to detect a disconnection.

Moreover, Japanese Unexamined Patent Application Publication No. H09-084155 discloses, in a control/monitor system which includes a single primary station and one or more secondary stations branch-connected to the primary station; controls the secondary stations by transmitting control signals sent out from the primary station to the secondary stations; and transmits a monitor signal containing a state of each secondary station to the primary station, a technique that enables the central primary station to detect a location of an abnormality, and to detect a disconnection even when a transmission cable is branched, thereby identifying states of apparatuses, such as a controlled part, a sensor part, and the like, at the center. In the system disclosed in this document, each frame sent out from the primary station includes a start signal with a long period of a power source voltage level, a data signal, a signal of an identification code (ID code) of each secondary station, and an end signal, and these frames are sequentially sent out while the ID codes are changed by turns. In each secondary station, an ID cord assigned to the secondary station and a counter value indicating a sending/receiving address of data are preset. If this ID cord matches that received from the primary station, each secondary station generates an end response at a timing of the end signal. In response, the primary station stores the end response from a corresponding one of the secondary stations, and records the configuration of the secondary stations.

SUMMARY OF INVENTION

Technical Problem

Unfortunately, conventional methods of detecting a disconnection in a simplified system fail to confirm whether or not a response indicating a disconnection is a true response from a slave station to be confirmed. For example, even false detection of noise may cause the system to determine that there is no disconnection. Therefore, a problem arises that a disconnection of a transmission line cannot be grasped precisely.

Thus, an object of the present invention is to provide, in a control/monitor signal transmission system employing a transmission synchronization scheme for transmitting data over a common data signal line by synchronizing a master station connected to a single control unit with a plurality of slave stations corresponding to a plurality of controlled apparatuses using a transmission clock, a transmission line disconnection detection method that enables a disconnection of a transmission line to be detected precisely, and to provide a slave station used for the method.

Solution to Problem

In a control/monitor signal transmission system to which a transmission line disconnection detection method according to the present invention is applied, a single master station is connected to a plurality of slave stations through a common data signal line. Under control of a transmission clock generated by a timing generation device that the master station has, the master station outputs a continuous pulse signal to the common data signal line as a control data signal in accordance with a value of control data received from a control unit. In addition, the master station extracts a data value of a monitor data signal superimposed on the continuous pulse signal from each slave station for each cycle of the clock, and then transfers the extracted data value to the control unit. Each slave station counts the pulses of the continuous pulse signal from a start signal indicating the beginning of the continuous pulse signal. Each slave station extracts, when the count value matches the own address of the slave station, the control data corresponding to the slave station from the continuous pulse signal, and each slave station superimposes the monitor data signal on the continuous pulse signal in the same pulse cycle of the clock when the control data corresponding to the slave station is extracted. Furthermore, in the transmission line disconnection detection method according to the present invention, there is provided, in the continuous pulse signal, a control/monitor data region, which includes data of the control data signal and data of the monitor data signal, and a management data region different from the control/monitor data region, the management data region including a plurality of pulse signals. A signal included in the individual identification data from the slave stations is superimposed on an input data period in the management data region. An output data period is superimposed with a signal included in management control data identifying one of the slave stations. The input data period corresponds to and has the same cycle as the output data period. Further, it is determined whether a disconnection is present or absent, on the basis of a result of comparison and collation between the individual identification data and comparative data.

The individual identification data may be an address assigned to each slave station, and the comparative data may be the management control data. Furthermore, the individual identification data may have a preset multi-bit value, and the comparative data may have the multi-bit value.

A slave station according to the present invention is connected to a common data signal line to which a master station is connected, and includes: an address extraction device; a monitor data transmission device; a management control data extraction device; a management monitor data transmission device; and an individual identification data output device. The address extraction device counts the pulses of a continuous pulse signal transmitted through the common data signal line using as a starting point a starting signal indicating the beginning of the continuous pulse signal. Then, the address extraction device obtains a control data signal at a timing when the count value matches the own address of the slave station. The monitor data transmission device superimposes, on the continuous pulse signal transmitted through the common data signal line, a monitor data signal as information from the slave station at a timing when the control data signal is transferred from the address extraction device. The management control data extraction device extracts management control data superimposed by the master station on a management data region of the continuous pulse signal. The management data region is different from a region to be superimposed with the monitor data signal and includes a plurality of pulse signals. The management monitor data transmission device superimposes a management monitor data signal as information from the slave station in an input data period. The input data period corresponds to and has the same cycle as an output data period superimposed with a signal included in the management control data. The individual identification data output device obtains address data from the management control data extraction device. In addition, the individual identification data output device transfers, when the address data matches the own address of the slave station, the individual identification data of the slave station to the management monitor data transmission device.

Advantageous Effects of Invention

In the transmission line disconnection detection method according to the present invention, the continuous pulse signal has a transmission clock, one cycle of which is separated into input and output data periods. This continuous pulse signal is provided with the management data region that includes a plurality of pulse signals and differs from the control/monitor data region that includes data of the control data signal and data of the monitor data signal. A signal included in the individual identification data of the slave station is superimposed on this management data region as a response from each slave station. Therefore, the response from the slave station to be detected is clearly identified. Furthermore, it can be determined whether a disconnection is present or absent, on the basis of the result of comparison and collation between the individual identification data and the comparative data. Thus, it is possible to detect a disconnection of a transmission line (hereinafter, referred to as "disconnection") precisely without falsely detecting noise as the response from the slave station to be detected.

Furthermore, each slave station counts the pulses of the continuous pulse signal by using the start signal indicating the beginning of the continuous pulse signal as the starting point. Then, each slave station extracts the control data signal from a pulse corresponding to the slave station among a plurality of pulses included in the control/monitor data region, and superimposes the monitor data signal on this pulse. Here, the pulses included in the management data region do not correspond to any of the slave stations, and do not change the data capacity of the control/monitor data region. In addition, a signal from each slave station which is included in the individual identification data is superimposed on the input data period. This input data period corresponds to the output data period on which a signal included in the management control data identifying one of the slave stations is superimposed, and has the same cycle as the output data period. Specifically, the transmission line disconnection detection method according to the present invention uses the management data region for both the data output from the master station and the data input from each slave station. Here, the management data region differs from the control/monitor data region including a plurality of pulses corresponding to each slave station, and does not correspond to any of the slave stations. Therefore, in the transmission synchronization scheme, it is possible to transmit management data (or the management control data and the management monitor data) from both of the master station and each slave station, as a continuous data group (one-frame transmission cycle) that starts from the starting signal, simultaneously with the control data and the monitor data, without impacting on the existing control/monitor data region. In addition, it is possible to suppress the impact on the transmission rate more strongly than a case where an output region from the master station and an input region from each slave station are provided independently of each other.

In the present invention, it is preferable that the pieces of individual identification data for the slave stations differ from one another, for example, be set to their address data required for the transmission synchronization. This is because it is possible to identify the individual identification data in the case where another slave station transmits the individual identification data by mistake.

Moreover, the slave station according to the present invention includes the management monitor data transmission device, and the individual identification data output device. The management monitor data transmission device superimposes the management monitor data signal on the input data period of the management data region, as information from the slave station. Here, the input data period corresponds to the output data period on which the signal included in the management control data is superimposed. The individual identification data output device transmits the individual identification data of the slave station to the management monitor data transmission device, when the address data that the master station accumulates on the management data region matches the own address of the slave station. Thus, the slave station is suitable for the transmission line disconnection detection method according to the present invention.

DESCRIPTION OF EMBODIMENTS

A description will be given of an embodiment of a control/monitor signal transmission system that employs a transmission line disconnection detection method according to the present invention, with reference to FIGS. 1 to 6.

Figure 2:
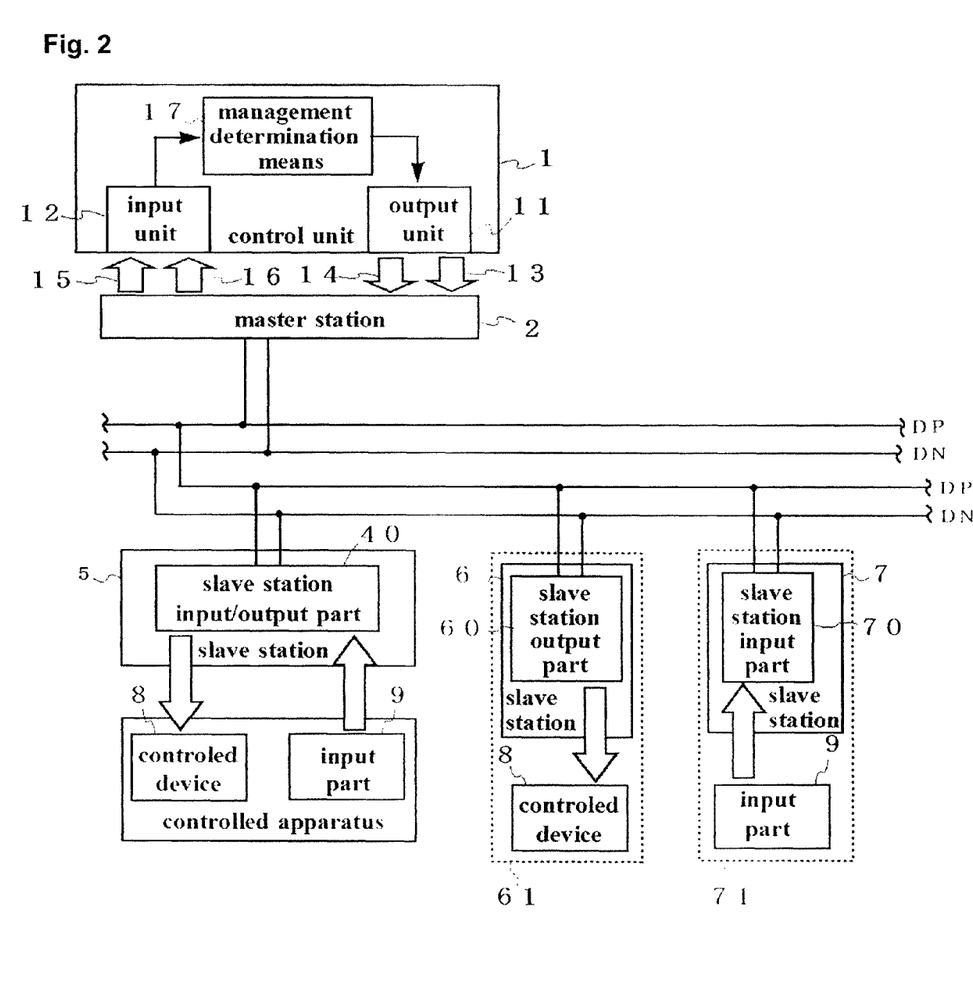
FIG. 2 is a system configuration diagram of a general configuration of the control/monitor signal transmission system.

As depicted in FIG. 2, this control/monitor signal transmission system includes: a single master station 2 connected to a control unit 1 and common data signal lines DP and DN; and an input/output slave station 5, an output slave station 6 and an input slave station 7 that are connected to the common data signal lines DP and DN. It should be noted that for each of the individual slave stations, a single slave station is depicted in FIG. 2 for the sake of depiction's convenience, but there is no limitation on the types and number of slave stations connected to the common data signal lines DP and DN.

Each of the input/output slave station 5, the output slave station 6 and the input slave station 7 performs either of a signal output process and an input signal process or both thereof. The signal output process is for each controlled part 8 which operates in accordance with an output instruction from the control unit 1. The input signal process is from each input part 9 which obtains input information to the control unit 1. It should be noted that examples of each controlled part 8 include an actuator, a (stepping) motor, a solenoid, a magnet-valve, a relay, a thyristor and a lamp, and examples of each input part 9 include a lead switch, a micro switch, a push button switch and a photoelectric switch. The input/output slave station 5 is connected to both the controlled part 8 and the input part 9. The output slave station 6 is connected only to the controlled part 8. The input slave station 7 is connected only to the input part 9. It should be noted that the output slave station 6 may incorporate the controlled part 8, and the input slave station 7 may incorporate the input part 9.

The control unit 1 may be, for example, a programmable controller, a computer, or the like, and includes: an output unit 11 that sends out control data 13 and management control data 14; and an input unit 12 that receives sensor data (data of a monitor data signal) 16 and disconnection detection data 15 from the side of the controlled apparatus 4. In addition, these output unit 11 and input unit 12 are connected to the master station 2. Furthermore, the control unit 1 is provided with management determination means 17 that calculates data to be sent out from the output unit 11, on the basis of data received from the input unit 12.

Figure 3:
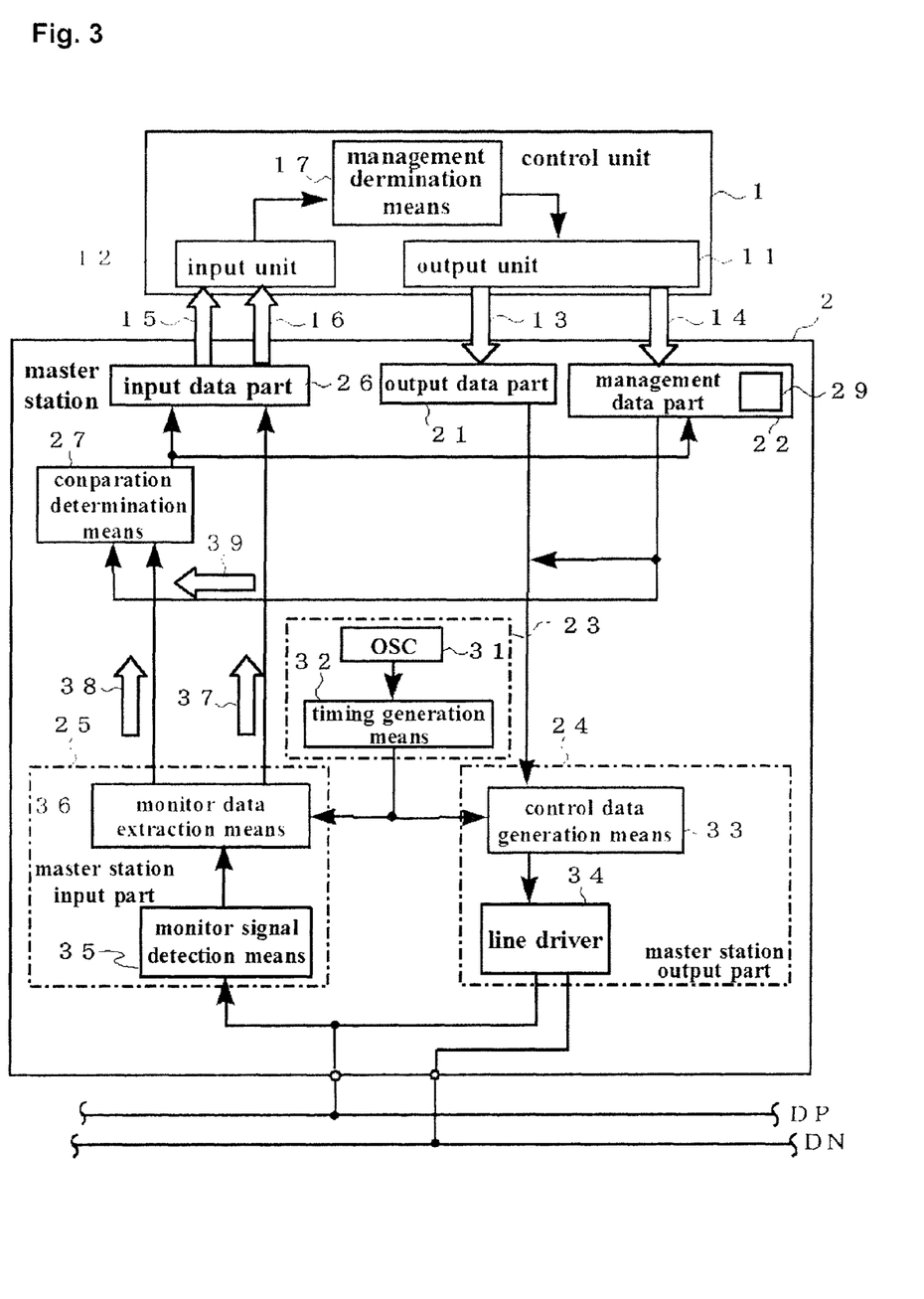
FIG. 3 is a system configuration diagram of the master station.

As depicted in FIG. 3, the master station 2 includes an output data part 21, a management data part 22, a timing generation part 23, a master station output part 24, a master station input part 25, an input data part 26, and comparison determination means 27. Furthermore, the master station 2 is connected to the common data signal lines DP and DN, and sends out, to the common data signal lines DP and DN, a control data signal (hereinafter, referred to as a transmission clock signal) that is a continuous pulse signal. In addition, the master station 2 sends out, to the input unit 12 of the control unit 1, comparison data based on a monitor data signal and a management monitor data signal that are sent out from the input/output slave station 5, the output slave station 6, or the input slave station 7 (hereinafter, referred to as slave stations 5, 6 and 7 when all of them are indicated), as the monitor data 16 and the disconnection detection data 15.

The output data part 21 receives parallel data from the output unit 11 of the control unit 1 as the control data 13, and passes it to the master station output part 24 as serial data.

The management data part 22 is provided with memory 29 of an IDX address table in which respective pieces of information regarding the slave stations 5, 6 and 7 are aggregated. In this embodiment, the IDX address table refers to data for identifying any one of the slave stations 5, 6 and 7 which is a target for confirming a disconnection, and initial addresses for the slave stations 5, 6 and 7 are used. The IDX address table is created in response to data table creation instruction, and steps of creating it will be described later.

The timing generation part 23 includes an oscillating circuit (OSC) 31 and timing generation means 32. The timing generation means 32 generates a timing clock of this system on the basis of the OSC 31, and passes it to the master station output part 24.

The master station output part 24 includes control data generation means 33 and a line driver 34. The control data generation means 33 sends out the transmission clock signal to the common data signal lines DP and DN through the line driver 24 as the continuous pulse signal, on the basis of the data received from the output data part 21 and the management data part 22, and the timing clock received from the timing generation part 23.

Figure 1:
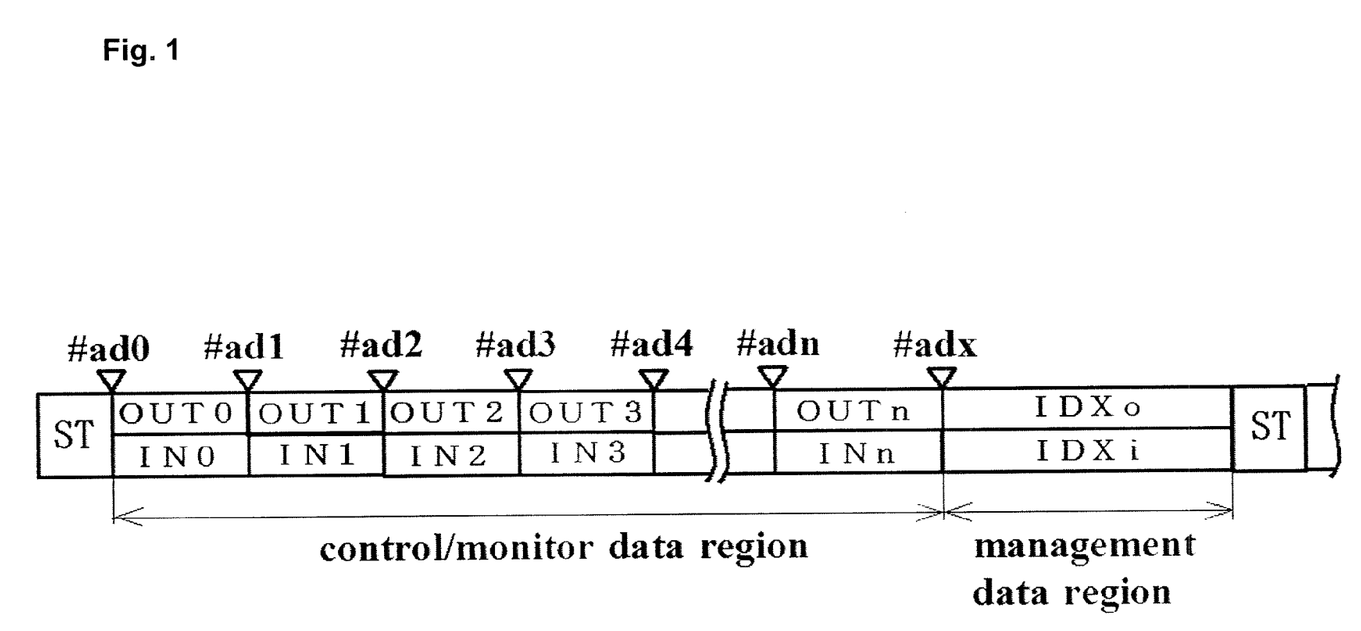
FIG. 1 is a schematic diagram of a transmission scheme performed between a master station and slave stations in an embodiment of a control/monitor signal transmission system that employs a transmission line disconnection detection method according to the present invention.
Figure 5:
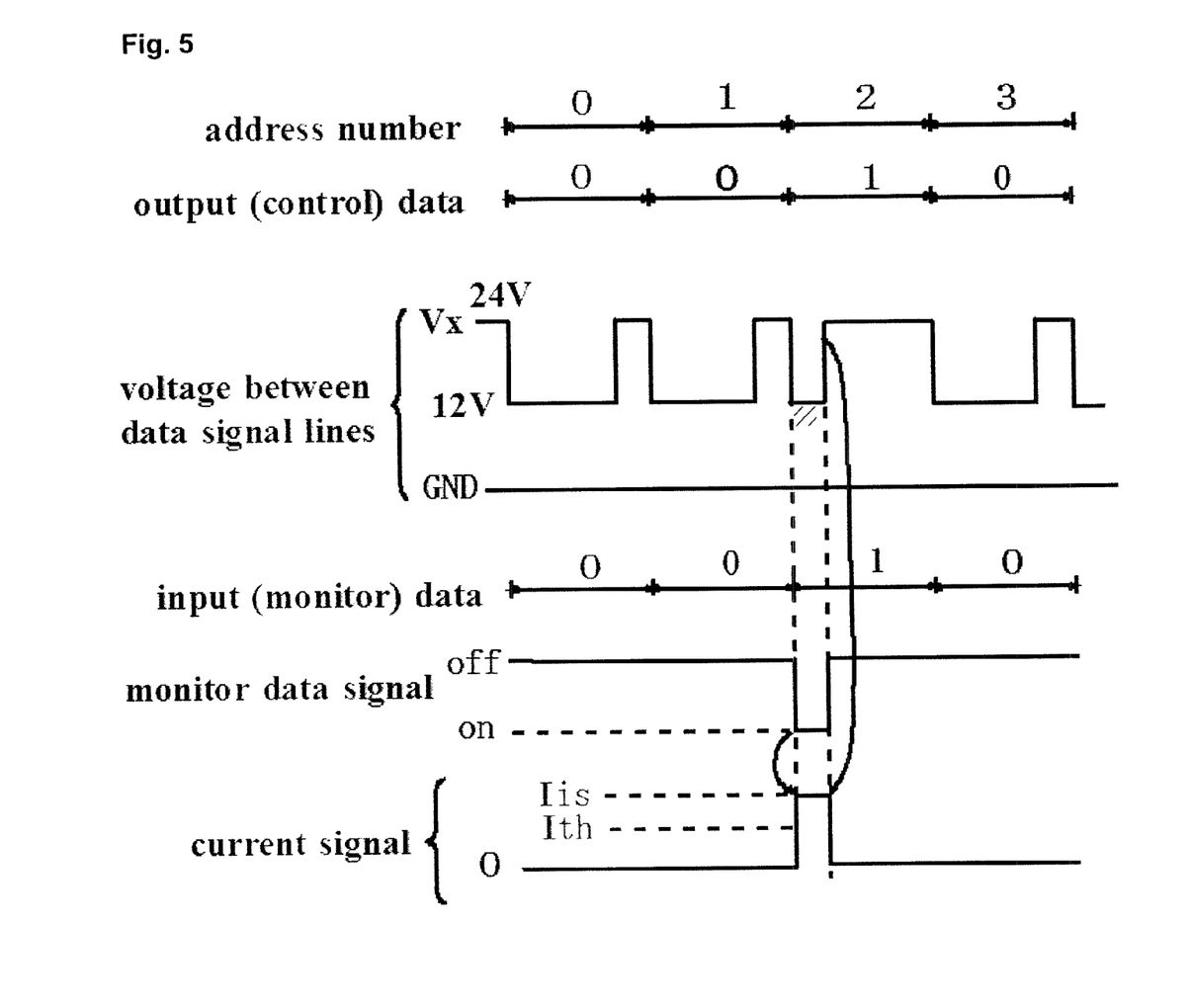
FIG. 5 is a timing chart of transmission clock signals.

As depicted in FIG. 1, the transmission clock signal has a control/monitor data region following a start signal ST, and a management data region following the control/monitor data region. The control/management data region includes: data OUTn (n denotes integer) of the control data signal that is sent out from the master station 2; and data INn (n denotes integer) of the monitor data signal that is sent out from the slave station 5, 6 or 7. As depicted in FIG. 5, the transmission clock signal has a high potential level (+24 V in this embodiment) and a low potential level (+12 V in this embodiment) in the latter half and first half of one cycle thereof, respectively. A pulse width interval of the first half of the pulse which has the low potential level becomes an output data period. Likewise, the first half of the pulse which has the low potential level also becomes an input data period. The pulse width interval of the low potential level represents the data OUTn of the control data signal, and the presence or absence of a current superimposed on the low potential level represents the data INn of the monitor data signal. In this embodiment, when one cycle of the transmission clock signal is set to t0, the pulse width interval of the low potential level extends from (¼)t0 to (¾)t0. However, there is no limitation on the pulse width interval of the low potential level, and it may be determined as appropriate as long as it depends on each data value of the control data 13 received from the control unit 1. Likewise, each of the input data period and the output data period may be determined as appropriate. For example, the input data period may be allocated to the first half of the pulse (low potential level) as in this embodiment, and the output data period may be allocated to the pulse width interval of the latter half of the pulse (high potential level). Reversely, the output data period may be allocated to the first half of the pulse (low potential level) as in this embodiment, and the input data period may be allocated to the latter half of the pulse (high potential level). Alternatively, both output and input data periods may be allocated to the latter half of the pulse (high potential level). These also apply to a case where the transmission clock signal has the low potential level in the latter half of one cycle thereof. It should be noted that the upper and lower stages of FIG. 1 depict the output and input data periods, respectively.

The management data region of the transmission clock signal includes a management control data region and a management monitor data region. Specifically, data IDXo of the management control data signal (hereinafter, referred to as management control data IDXo) sent out from the master station 2 is superimposed on the management control data region. Data IDXi (hereinafter, referred to as management monitor data IDXi) sent out from the slave station 5, 6 or 7 is superimposed on the management monitor data region. The management control data IDXo is represented as the pulse width interval at the low potential level, similar to the data OUTn of the control data signal. The management monitor data IDXi is represented as the presence or absence of a current superimposed on the low potential level, similar to the data INn of the monitor data signal.

The start signal ST has the same potential level as the high potential level of the transmission clock signal, and becomes a longer signal than one cycle of the transmission clock signal.

The master station input part 25 includes monitor signal detection means 35 and monitor data extraction means 36. The master station input part 25 sends out serial input data 37 to the input data part 26, and sends out extracted IDXi data 38 to the comparison determination means 27. The monitor signal detection means 35 detects a monitor data signal and a management monitor data signal that have been sent out from the slave station 5, 6 or 7 via the common data signal lines DP and DN. A data value of each of the monitor data signal and the management monitor data signal is represented by the presence or absence of a current superimposed on the low potential level, as described above. After the start signal ST is sent, the monitor signal detection means 35 first sequentially receives monitor data signals from each of the input/output slave station 5 and the input slave station 7, and subsequently receives the management monitor data signal from one of slave stations 5, 6 and 7. The data of the monitor data signal and the data of the management monitor data signal synchronize with the signal of the timing generation means 33, and are extracted by the monitor data extraction means 36. Then, the monitor data extraction means 36 sends out the data of the monitor data signal to the input data part 26 as the serial input data 37. In addition, the monitor data extraction means 36 sends out serial IDXi data 38, which is the management monitor data signal, to the comparison determination means 27. The comparison determination means 27 compares and collates the IDXi data 38 with the address data 39 (having the same value as the management control data IDXo) passed from the management data part 22. Then, the comparison determination means 27 sends out the matching result to the input data part 26 and the management data part 22.

The input data part 26 converts the serial input data received from the master station input part 25 into parallel data, and sends it out to the input unit 12 of the control unit 1 as the monitor data 16. In addition, the input data part 26 sends out the data received from the comparison determination means 27 to the input unit 12 of the control unit 1 as the disconnection detection data 15.

Figure 4:
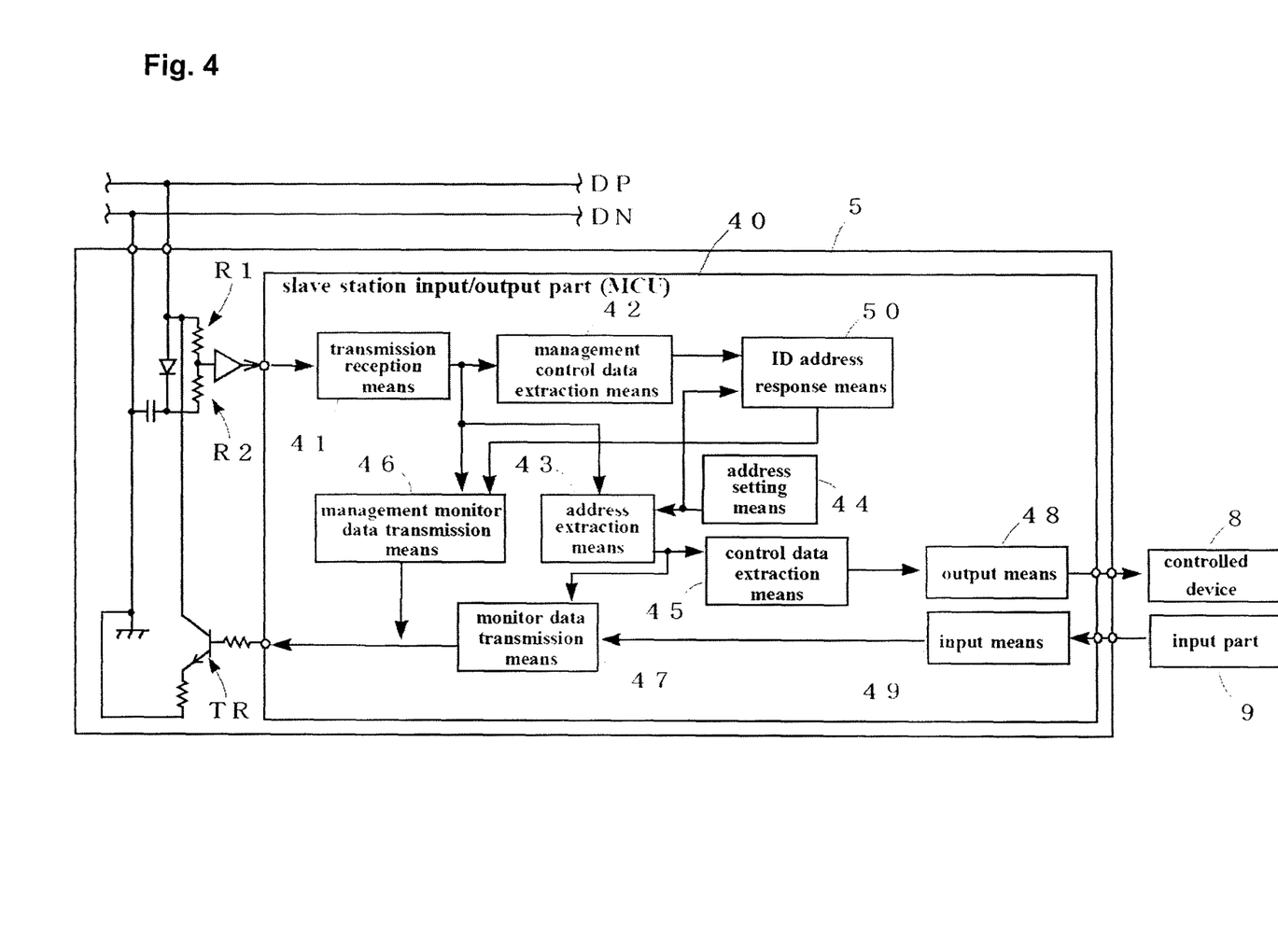
FIG. 4 is a system configuration diagram of the input/output slave station.

As depicted in FIG. 4, the input/output slave station 5 is provided with a slave station input/output part 40 including transmission reception means 41, management control data extraction means 42, address extraction means 43, address setting means 44, control data extraction means 45, management monitor data transmission means 46, monitor data transmission means 47, output means 48, input means 49, and ID address response means 50. It should be noted that the input/output slave station 5 of this embodiment is provided with an MCU, which is a microcomputer control unit, as an internal circuit, and this MCU functions as the slave station input/output part 40. The calculation and storage necessary for the processing are performed using a CPU, a RAM and a ROM that this MCU (hereinafter, referred to as an MCU 40) has. However, the relationship among the CPU, the RAM and the ROM in the processing performed by the means included in the slave station input/output part 40 is omitted in the drawings, for the sake of description's convenience.

The transmission reception means 41 receives the transmission clock signal that has been transmitted over common data signal lines DP and DN, and passes it to the management control data extraction means 42, the address extraction means 43, and the management monitor data transmission means 46. The management control data extraction means 42 extracts the data of the management control data signal from the management data region of the transmission clock signal, and passes it to the ID address response means 50. Meanwhile, the address extraction means 43 counts pulses of the transmission clock signal by using the start signal ST indicating the beginning of the transmission clock signal as a starting point. Then, the address extraction means 43 passes the control data signal to the control data extraction means 45 and the monitor data transmission means 47 at a timing when the count value matches the own address data of the slave station which is set by the address setting means 44.

The control data extraction means 45 extracts a data value from the control data signal passed from the address extraction means 43, and passes it to the output means 48 as serial data. The output means 48 converts the serial data passed from the control data extraction means 45 into parallel data, and outputs it to the controlled part 8, causing the controlled part 8 to perform a predetermined operation.

The monitor data transmission means 47 turns on or off a base current of a transistor TR on the basis of the serial data passed from the input means 49, at a timing of receiving the control data signal from the address extraction means 43. When the base current is turned on, the transistor TR is turned on, thereby outputting a current signal, which is a monitor data signal, to the data signal lines DP and DN. In this embodiment, as depicted in FIG. 5, the current signal is represented by feeding a current (for example 30 mA) that is equal to or higher than a preset value Ith, when the data value of the monitor data signal becomes "1." Accordingly, for example, the pieces of monitor data at addresses 0 (#ad0), 1 (#ad1), 2 (#ad2) and 3 (#ad3) of a signal depicted in FIG. 5 represent "0," "0," "1" and "0," respectively. The data that the input means 49 passes to the monitor data transmission means 47 is based on an input from the input part 9. For example, if an ON/OFF switch is connected as the input part 9, the data is based on a current signal or a voltage signal indicating the "on" or "off" of the switch.

The management monitor data transmission means 46 counts the pulses of the transmission clock signal by using the start signal ST of the transmission clock signal as a starting point, and obtains timing of the management data region. Then, the management monitor data transmission means 46 outputs the base current of the transistor TR on the basis of the data passed from the ID address response means 50, thereby outputting the current signal, which is the management monitor data signal, to the data signal lines DP and DN.

The ID address response means 50 corresponds to individual identification data output means of the present invention. When the data IDXo of the management control data signal which has been passed from the management control data extraction means 42 matches the data value of the own address of the slave station, the ID address response means 50 outputs this address (corresponding to individual identification data of the present invention). Here, the timing when the ID address response means 50 outputs the own address of the slave station is delayed from a frame of the data IDXo in the management control data signal which matches the data value of the own address of the slave station, by one frame transmission cycle.

A slave station output part 60 of the output slave station 6 has the same configuration as the slave station input/output part 40 does, except that it does not have the input means 49. Accordingly, a description of the slave station output part 60 will be omitted. A slave station input part 70 of the input slave station 7 has the same configuration as the slave station input/output part 40 does, except that it does not have output means 48. Accordingly, a description of the slave station input part 70 will be omitted.

Next, a description will be given of steps of a transmission line disconnection detection method performed by the control/monitor signal transmission system configured above.

First, this control/monitor signal transmission system creates the IDX address table. In creating the IDX address table, the control unit 1 sends out an instruction of creating the IDX address table to the master station 2. In response to this instruction, the master station 2 sequentially designates addresses assigned to all of the slave stations 5, 6 and 7 with the management control data IDXo, for each transmission cycle including the start signal ST and the following control/monitor data region and management data region.

When the management control data IDXo becomes the own address of the slave station, each of the slave stations 5, 6 and 7 returns the own address of the slave station as the management monitor data IDXi. In response, the master station 2 extracts the management monitor data IDXi. Then, the master station 2 compares and collates between the management monitor data IDXi and the management control data IDXo. If the management monitor data IDXi matches the management control data IDXo, the master station 2 stores the management monitor data IDXi as data included in the IDX address table.

Only initial addresses are stored in the created IDX address table as data of the IDX address table. Regarding the case depicted in FIG. 6, in a station to which an address of #ad0 is given, the monitor data signal has a 1-bit data value, and the data of the IDX address table has consecutive values of #ad0 and #ad1. In a station to which an address of #ad1 is given, a pulse of #ad2 is also assigned to the station to which the address of #ad1 has been given, because the monitor data signal has a 2-bit data value. For this reason, #ad3 is stored in the data of the IDX address table as a next value for #ad1. In this embodiment, even when the monitor data signal has a 1-bit data value, or #ad0, it becomes an initial address, similar to #ad1.

Once recognizing the completion of the creation of the IDX address table, the control unit 1 outputs the control management data 14 for instructing the confirmation of a disconnection. In response, the master station 2 outputs the management control data IDXo that designates one piece of data in data group stored in the IDX address table.

When the management control data IDXo matches the own address of the slave station, each of the slave stations 5, 6 and 7 returns the own address of the slave station as the management monitor data IDXi. In response, the master station 2 extracts the management monitor data IDXi, and compares and collates it with the management control data IDXo, and passes the comparison and collation result to the control unit 1 as the disconnection detection data 15.

If the comparison and collation result indicates the matching between the extracted management monitor data IDXi and the management control data IDXo, the control unit 1 determines that no disconnection occurs in the transmission line. Otherwise, if the comparison and collation result indicates the mismatching, the control unit 1 determines that a disconnection occurs in the transmission lines to the slave stations 5, 6 and 7.

Figure 6:
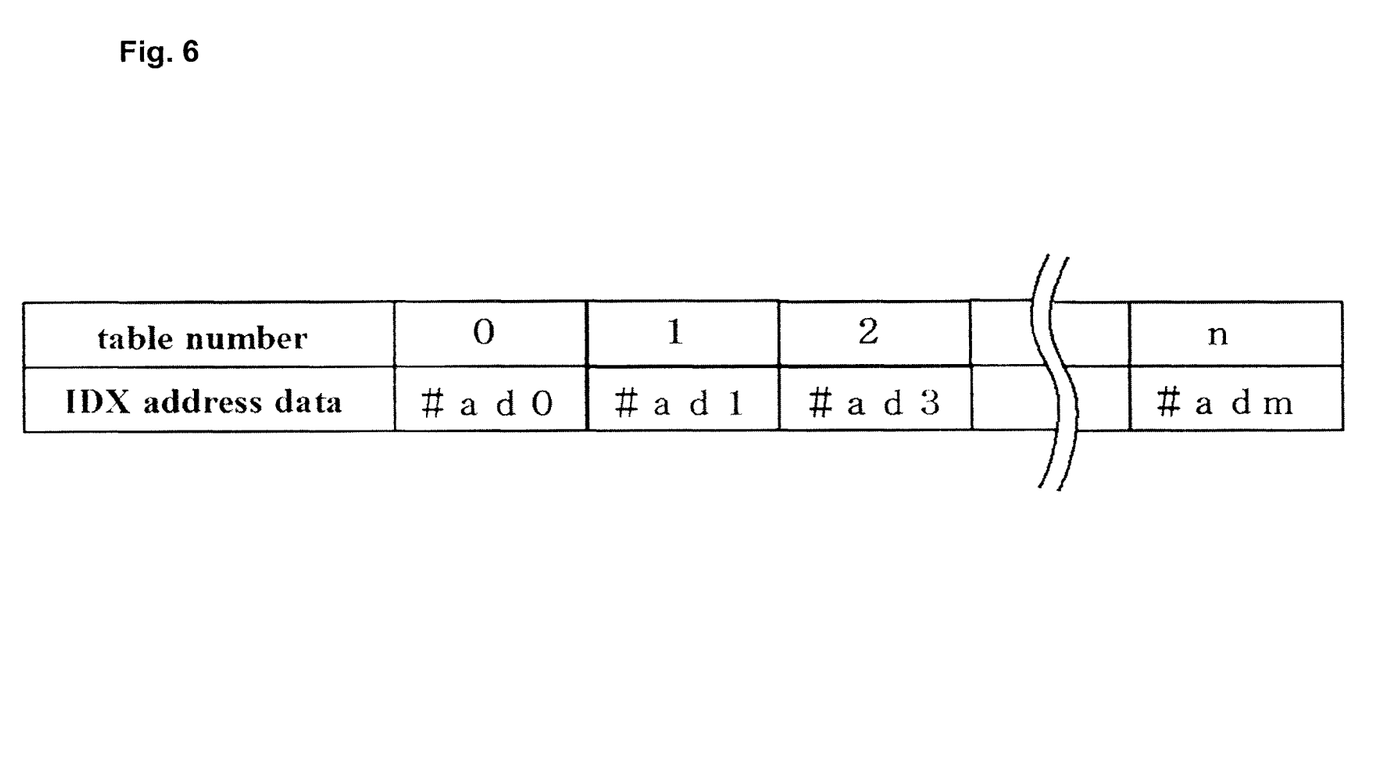
FIG. 6 is a schematic diagram of an IDX address data table stored in the master station.

The management control data IDXo designates the data in the IDX address table in accordance with the table number. Specifically, the master station 2 first selects the index address data (#ad0) in the table number 1, and outputs it as the management control data IDXo. The selected index address data is sequentially changed to the initial address corresponding to each individual table number, per transmission cycle. There is no limitation on the sequence in which the management control data IDXo designates the data in the IDX address table. For example, the sequence may conform to the priority order in terms of the function.

The individual identification data may be multi-bit data so as to make it possible to clearly discriminate between the response from any of the slave stations 5, 6 and 7 and noise. A description will be given of an embodiment that employs a preset multi-bit value as the individual identification data, with reference to FIG. 7. It should be noted that in FIG. 7, the same reference numerals are given to substantially the same components as those of the embodiment depicted in FIGS. 1 to 6, and a description thereof will be omitted.

Figure 7:
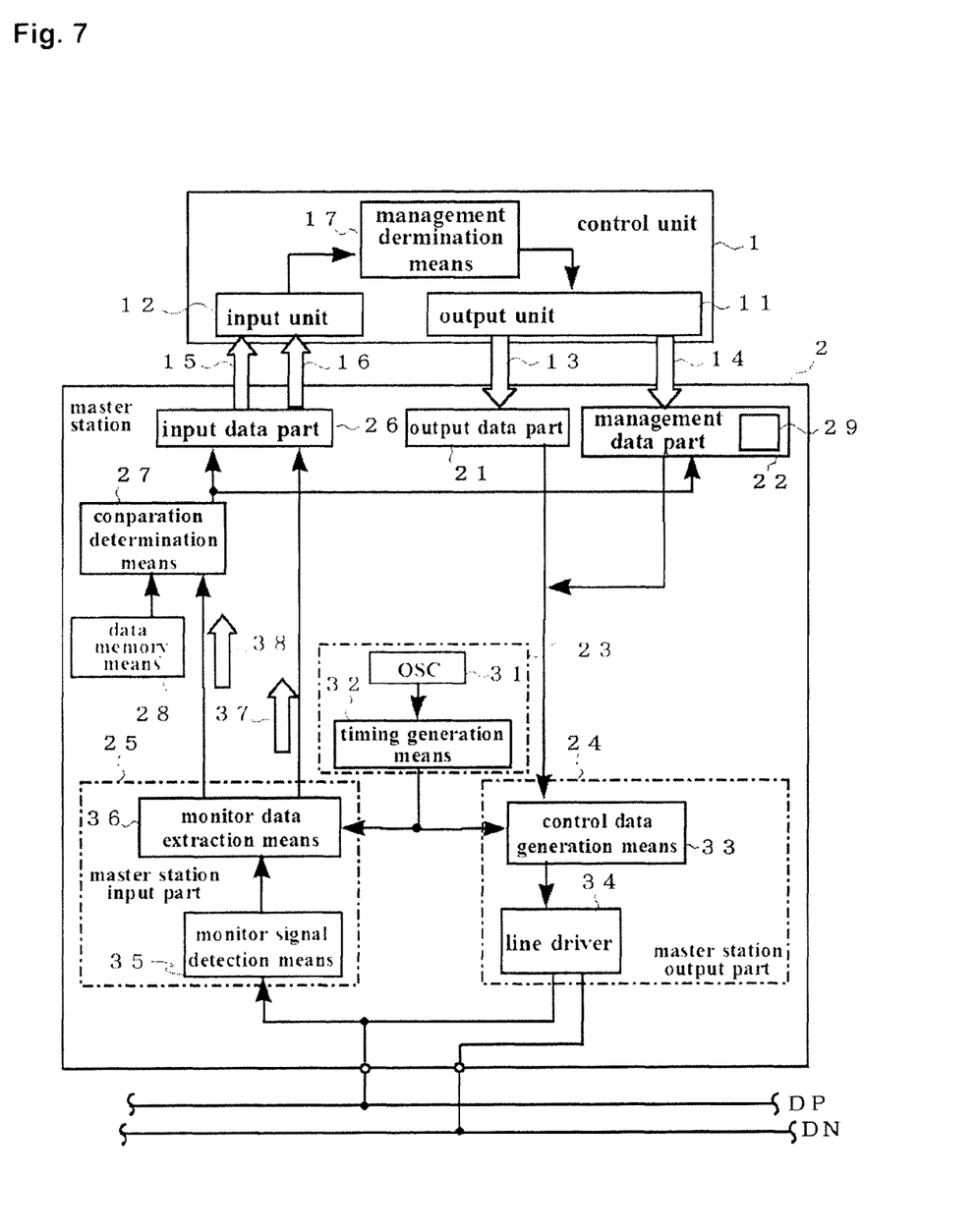
FIG. 7 is a system configuration diagram of a master station in another embodiment of the control/monitor signal transmission system.

In this embodiment, the ID address response means 50 in each of the slave stations 5, 6 and 7 internally stores preset multi-bit values (for example, "1010," etc.) as the individual identification data. The ID address response means 50 outputs the multi-bit value, when the data IDXo of the management control data signal passed from the management control data extraction means 42 matches the data value of the own address of the slave station. The master station 2 is provided with data memory means 28 for storing preset multi-bit values, which are individual identification data, as comparative data. The comparison determination means 27 compares and collates the comparative data passed from the data memory means 28 with the IDXi data 38, and sends out the matching result to the input data part 26 and the management data part 22.

REFERENCE NUMERALS

1 control unit
2 master station
5 input/output slave station
6 output slave station
7 input slave station
8 controlled device
9 input part
11 output unit
12 input unit
13 control data
14 management control data
15 disconnection detection data
16 monitor data
17 management determination means
21 output data part
22 management data part
23 timing generation part
24 master station output part
25 master station input part
26 input data part
27 comparison determination means
28 data memory means
29 memory
31 oscillating circuit (OSC)
32 timing generation means
33 control data generation means
34 line driver
35 monitor signal detection means
36 monitor data extraction means
37 input data
38 IDXi data
39 address data
40 slave station input/output part
41 transmission reception means
42 management control data extraction means
43 address extraction means
44 address setting means
45 control data extraction means
46 monitor data transmission means
47 management monitor data transmission means
48 output means
49 input means
50 ID address response means
60 slave station output part
70 slave station input part
TR transistor

CITATION LIST

Patent Literature

PTL 1: Japanese Unexamined Patent Application Publication No. S62-173830
PTL 2: Japanese Unexamined Patent Application Publication No. H07-099503
PTL 3: Japanese Unexamined Patent Application Publication No. H09-084155

What is claimed is:

1. A slave station terminal connected to a common data signal line to which a master station is connected, the slave station comprising:
   an address extraction device, the address extraction device counting pulses of a continuous pulse signal transmitted through the common data signal line using as a starting point a starting signal indicating the beginning of the continuous pulse signal, the address extraction device obtaining a control data signal at a timing when a count value matches an address of the slave station;
   a monitor data transmission device, the monitor data transmission device superimposing, on the continuous pulse signal, a monitor data signal as information from the slave station at a timing when the control data signal is transferred from the address extraction device;
   a management control data extraction device, the management control data extraction device extracting management control data superimposed by the master station on a management data region of the continuous pulse signal, the management data region being different from a region to be superimposed with the monitor data signal and including a plurality of pulse signals;
   a management monitor data transmission device, the management monitor data transmission device superimposing a management monitor data signal as information from the slave station in an input data period, the input data period corresponding to and having the same cycle as an output data period superimposed with a signal included in the management control data; and
   an individual identification data output device, the individual identification data output device obtaining address data from the management control data extraction device, and transferring, when the address data matches the address of the slave station, individual identification data of the slave station to the management monitor data transmission device, wherein the individual identification data is the matched address assigned to each slave station, and the management control data is a comparative data.

2. The slave station terminal according to claim 1, wherein the individual identification data has a preset multi-bit value, and the comparative data has the multi-bit value.

3. A method for detecting a transmission line disconnection in a control/monitor signal transmission system, the control/monitor signal transmission system having a single master station having a timing generator, a plurality of slave stations, and a common data signal line connecting the master station to the slave stations, the method comprising:
- outputting from the master station to the common data signal line, under control of a transmission clock generated by the timing generator, a continuous pulse signal as a control signal according to a value of control data received from a control unit;
- extracting by the master station from the continuous pulse signal, under the control of the transmission clock generated by the timing generator, a data value of a monitoring data signal superimposed on the continuous pulse signal from each slave station for each cycle of the transmission clock and then transfers the data value to the control unit;
- counting, by each slave station, pulses of the continuous pulse signal from a starting signal indicating the beginning of the continuous pulse signal;
- extracting by each slave station when the count value matches an address of the slave station, the control data corresponding to the address from the continuous pulse signal;
- superimposing by each slave station the monitoring data signal on the continuous pulse signal in the same pulse cycle of the transmission clock when the control data corresponding to the address is extracted;
- providing, in the continuous pulse signal, a management data region including a plurality of pulse signals, the management data region being different from a control/monitor data region comprising data of the control data signal and data of the monitor data signal;
- superimposing a signal included in individual identification data from the slave stations on an input data period in the management data region, the input data period corresponding to and having the same cycle as an output data period, the output data period being superimposed with a signal included in management control data identifying one of the slave stations; and
- determining whether a disconnection is present or absent, on the basis of a result of comparison and collation between the individual identification data and comparative data wherein the individual identification data is the matched address assigned to each slave station, and the comparative data is the management control data.

4. The method according to claim 3, wherein the individual identification data has a preset multi-bit value, and the comparative data has the multi-bit value.

5. A detection system for detecting a transmission line disconnection in a control/monitor signal transmission system, the control/monitor signal transmission system having a single master station having a timing generator, a plurality of slave stations, and a common data signal line connecting the master station to the slave stations, the detection system comprising:
- a controller configured to control a transmission clock generated by the timing generation device such the master station outputs to the common data signal line a continuous pulse signal as a control signal according to a value of control data received from a control unit, and such that the master station extracts from the continuous pulse signal a data value of a monitoring data signal superimposed on the continuous pulse signal from each slave station for each cycle of the clock and then transfers the data value to the control unit, wherein:
  - each slave station counts pulses of the continuous pulse signal from a starting signal indicating the beginning of the continuous pulse signal, and each slave station extracts, when the count value matches an address of the slave station, the control data corresponding to the address from the continuous pulse signal, and
  - each slave station superimposes the monitoring data signal on the continuous pulse signal in the same pulse cycle of the clock when the control data corresponding to the address is extracted;
- a management data region present in the continuous pulse signal, including a plurality of pulse signals, the management data region being different from a control/monitor data region comprising data of the control data signal and data of the monitor data signal;
- a superimposer configured to superimpose, on an input data period in the management data region, a signal in individual identification data from the slave stations, the input data period corresponding to and having the same cycle as an output data period, the output data period being superimposed with a signal included in management control data identifying one of the slave stations; and
- a determiner configured to determine whether a disconnection is present or absent, on the basis of a result of comparison and collation between the individual identification data and comparative data, wherein the individual identification data is the matched address assigned to each slave station, and the comparative data is the management control data.

6. The detection system according to claim 5, wherein the individual identification data has a preset multi-bit value, and the comparative data has the multi-bit value.

7. At least one non-transitory computer-readable medium readable by a computer for detecting a transmission line disconnection in a control/monitor signal transmission system, the control/monitor signal transmission system having a single master station having a timing generator, a plurality of slave stations, and a common data signal line connecting the master station to the slave stations, the at least one non-transitory computer-readable medium comprising:
- an outputting code segment which, when executed, outputs from the master station to the common data signal line, under control of a transmission clock generated by the timing generator, a continuous pulse signal as a control signal according to a value of control data received from a control unit;
- a first extracting code segment which, when executed, extracts by the master station from the continuous pulse signal, under the control of the transmission clock generated by the timing generator, a data value of a monitoring data signal superimposed on the continuous pulse signal from each slave station for each cycle of the transmission clock and then transfers the data value to the control unit;
- a counting code segment which, when executed, counts, by each slave station, pulses of the continuous pulse signal from a starting signal indicating the beginning of the continuous pulse signal;
- a second extracting code segment which, when executed, extracts by each slave station when the count value matches an address of the slave station, the control data corresponding to the address from the continuous pulse signal;
- a first superimposing code segment which, when executed, superimposes by each slave station the monitoring data signal on the continuous pulse signal in the same pulse cycle of the transmission clock when the control data corresponding to the address is extracted;

a providing segment which, when executed, provides in the continuous pulse signal, a management data region including a plurality of pulse signals, the management data region being different from a control/monitor data region comprising data of the control data signal and data of the monitor data signal;

a second superimposing code segment which, when executed, superimposes a signal included in individual identification data from the slave stations on an input data period in the management data region, the input data period corresponding to and having the same cycle as an output data period, the output data period being superimposed with a signal included in management control data identifying one of the slave stations; and a determining segment which, when executed, determines whether a disconnection is present or absent, on the basis of a result of comparison and collation between the individual identification data and comparative data, wherein the individual identification data is the matched address assigned to each slave station, and the comparative data is the management control data.

8. The at least one non-transitory computer-readable medium according to claim 7, wherein the individual identification data has a preset multi-bit value, and the comparative data has the multi-bit value.

\* \* \* \* \*